UNITED STATES PATENT OFFICE.

PETER FIREMAN, OF TRENTON, NEW JERSEY, ASSIGNOR TO MAGNETIC PIGMENT COMPANY, A CORPORATION OF NEW YORK.

PIGMENT AND METHOD OF PRODUCING THE SAME.

1,392,926.  Specification of Letters Patent.  Patented Oct. 11, 1921.

No Drawing.  Application filed June 22, 1920.  Serial No. 390,810.

*To all whom it may concern:*

Be it known that I, PETER FIREMAN, a citizen of the United States, residing at Trenton, in the county of Mercer, State of New Jersey, have invented certain new and useful Improvements in Pigments and Methods of Producing the Same; and I do hereby declare the following to be a full, clear, and exact description of the invention, such as will enable others skilled in the art to which it appertains to make and use the same.

This invention relates to colored pigments produced by oxidation of ferrous hydroxid under regulated conditions and has for its object the production, in a relatively inexpensive manner, of brown pigments characterized by fine color and texture and adapted for application to a wide variety of purposes.

The numerous advantages of the invention will be apparent upon reference to the following specification in which I have described preferable modes of procedure in producing the pigments. It is to be understood that the description of the invention is illustrative merely and that various modifications may be introduced through substitution of other than the specified materials and by variation of the relative proportion of these materials and the temperatures employed within the scope of the accompanying claims, it being my intention to claim as my invention the method whereby the advantageous results hereinafter described are accomplished, as well as the products of these methods.

In Letters Patent Nos. 802,928 and 957,044, the treatment of freshly precipitated ferrous hydroxid to produce certain black pigments has been fully described. These pigments have a chemical composition which is indicated, for example, by the formula, $FeO.Fe_2O_3$. In the earlier of these patents, the pigments produced contained ferrous and ferric iron in the ratio of 1:2, whereas the second patent describes a product in which the ratio of ferrous to ferric iron varies from 1:0.5 to 1:2. In producing these pigments, the freshly precipitated ferrous hydroxid is oxidized with air while it is suspended in the mother liquor, which is maintained at a relatively high temperature, in the neighborhood of 185° to 203° F. Oxidation is controlled to the extent that when the required ratio of ferrous to ferric iron has been obtained, the reaction is stopped and care is taken to prevent subsequent oxidation beyond the desired ratio. As pointed out, the temperature at which the reaction is conducted is relatively high throughout and no variation of the proportion of the precipitant, or the mode of conducting the oxidation to produce other than black pigments, is specified in the patents.

Research has disclosed that a variety of products, depending upon various factors, are produced by oxidizing freshly precipitated ferrous hydroxid. When the reaction is relatively uncontrolled, as in the patents above referred to, a precipitate of ferrous-ferric oxid is produced. When, however, variations are made in the completeness of precipitation and oxidation is carried out under lower temperatures, the reaction may be directed to produce colored pigments having the composition of ferric oxid for example $Fe_2O_3$, in the form of yellowish brown or reddish brown pigments, and $Fe_2O_3$ carrying from 4-6% of water of hydration, which is a pigment exhibiting different tan shades. These pigments are of brilliant color and have a high luster. They are, moreover, voluminous and absorb oil to a marked extent. For example, the yellowish and reddish brown pigments absorbs between 1½ and 2 times more oil than ordinary zinc white while the tan pigments are capable of absorbing 4 times as much oil as zinc white. The pigments may be applied to any of the uses to which such materials are ordinarily put and are particularly adapted to form the body of printing ink. In this connection the discovery has been made that conducting the oxidation more energetically at higher temperatures tends to form brown pigments of reddish shades while more gradual oxidation at lower temperatures tends to form brown pigments of yellowish shades. This phenomena is particularly marked when alkalis are used as precipitating agents. If alkaline earths are used as precipitating agents and oxidation is carried on at low temperature brown pigments of remarkable tan shades are obtained.

In carrying out the invention, it is preferable to employ a mother liquor of ferrous chlorid, although other ferrous salts, such as sulfate, for example, are available. As a precipitant, sodium carbonate or calcium hydroxid is advantageously used as hereinafter specified, but it is to be understood that other soluble hydroxids or carbonates capable of precipitating iron as ferrous hydroxid may be substituted. Air is preferably employed as an oxidizing agent but oxygen or gaseous mixtures containing oxygen are also available. The mother liquor is heated by means of steam and is preferably introduced with the air to produce the desired temperature. The amount of steam admitted must be carefully regulated so that the temperature of the material does not rise above a predetermined maximum to prevent formation of black oxids, and preferably the increase of temperature occurs gradually in starting the reaction and over a considerable period of time. The reaction is carried out in any suitable container or tank which is preferably constructed to permit the dissemination of air and steam through the liquid.

As a specific example of the application of the invention in the production of brown pigments, I preferably employ a solution of ferrous chlorid having a specific gravity of substantially 1.070 to 1.100 and add thereto sodium carbonate in quantity sufficient to produce an alkaline reaction during the introduction of air and steam. The temperature is controlled so that it does not rise above 110° F. during the first two hours of operation where the volume of solution is sufficient to produce one ton of the product. The supply of steam is carefully regulated so that the solution gradually approaches the boiling temperature which is reached after three or four more hours and oxidation is continued at this temperature until substantially complete. The product, after filtering, washing and drying, is a bright brown pigment of velvety texture, high luster and yellowish shade.

In operating with the same reacting bodies of the same concentration and in the same proportions but at a higher temperature at an early stage of the oxidation brown pigments are obtained which are of equally high quality and are distinguished by more reddish shades. In this case air is used and steam is introduced at a rate which causes boiling in less than one hour.

The procedure may be varied to produce brown pigment in tan shades by passing a current of air into a dilute solution of ferrous chlorid having a specific gravity of 1.05 to which calcium hydroxid has been added in quantity sufficient only to partially precipitate the iron. Steam is supplied with the air to raise the temperature to substantially 105° F. and oxidation is completed between this temperature and substantially 130° F. The oxidation will be complete in the course of a few hours and by varying the degrees of temperature within narrow limits, a series of pigments are obtained covering a range of tan shades, the pigment being voluminous and lustrous in color, when filtered from the solution and dried. The condition surrounding the reaction must be carefully guarded inasmuch as if heated too energetically, black ferro-ferric oxid is produced.

As above pointed out, sodium carbonate and calcium hydroxid are mentioned merely as indicative of materials readily available and best adapted to the accomplishment of the desired object. Other soluble hydroxids or carbonates may be substituted and the proportions and temperatures mentioned may be varied, dependent upon the strength and character of the reagents employed to produce a variety of well defined pigments having the general characteristics noted.

The foregoing examples will enable anyone skilled in the art to practice the invention and to produce pigments of the color and character described; and slight variations therefrom are within the scope of the invention which depends upon the discovery that colored pigments may be produced by regulated oxidation of freshly precipitated ferrous hydroxid with careful attention to the details of temperature and mode of directing the reaction.

The possibility of economically producing desirable pigments in quantity sufficient to meet increasing demands for such material will be readily appreciated. The raw materials for the production of pigments in accordance with the invention are readily available in the market and may be obtained in any quantity desired at slight expense. No peculiar apparatus is essential to the practice of the invention and it is deemed unnecessary, therefore, to illustrate or describe an apparatus inasmuch as any chemist will readily devise, from materials at hand.

I claim:

1. As an article of manufacture, a voluminous red-brown pigment produced by the oxidation of precipitated ferrous hydroxid.

2. As an article of manufacture, a lustrous red-brown pigment having a chemical composition indicated by the formula $Fe_2O_3$.

3. As an article of manufacture, a voluminous red-brown pigment having a high luster and consisting of ferric oxid and produced by oxidation of ferrous hydroxid.

4. A method of preparing brown pigments which comprises, oxidizing precipitated-ferrous hydroxid, suspended in the mother liquor, at a temperature exceeding 110° F. during the early stages of oxidation and regulating the reaction to prevent formation of black oxids.

5. A method of preparing brown pigments which comprises energetically oxidizing precipitated-ferrous hydroxid, suspended in the mother liquor, at a temperature exceeding 110° F. during the early stages of oxidation and controlling the temperature to prevent formation of black oxids.

6. A method of preparing brown pigments which comprises, energetically oxidizing precipitated-ferrous hydroxid, suspended in the mother liquor, at a temperature exceeding 110° F. during the early stages of oxidation in the early stages of oxidation, and regulating the reaction to prevent formation of black oxid.

7. A method of preparing brown pigments which comprises, adding to a solution of an iron salt, a quantity of an alkali metal carbonate sufficient to produce an alkaline reaction, and energetically oxidizing the precipitated-ferrous hydroxid at a temperature exceeding 110° F. during the early stages of oxidation and regulating the reaction to prevent formation of black oxid.

8. A method of preparing brown pigments which comprises, adding to a solution of ferrous chlorid, a quantity of sodium carbonate sufficient to produce an alkaline reaction and energetically oxidizing the precipitated-ferrous hydroxid at a temperature exceeding 110° F. during the early stages of oxidation.

In testimony whereof I affix my signature.

PETER FIREMAN.